US008928501B2

(12) United States Patent
Matsuzawa

(10) Patent No.: US 8,928,501 B2
(45) Date of Patent: Jan. 6, 2015

(54) INPUT-KEY CONTROL DEVICE, AND METHOD AND COMPUTER PROGRAM PRODUCT FOR CONTROLLING INPUT KEY

(71) Applicant: Junji Matsuzawa, Kanagawa (JP)

(72) Inventor: Junji Matsuzawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/682,817

(22) Filed: Nov. 21, 2012

(65) Prior Publication Data

US 2013/0076640 A1 Mar. 28, 2013

Related U.S. Application Data

(63) Continuation of application No. 12/819,537, filed on Jun. 21, 2010, now Pat. No. 8,339,289.

(30) Foreign Application Priority Data

Jul. 21, 2009 (JP) ................................. 2009-169936

(51) Int. Cl.
H04N 1/00 (2006.01)
G06F 3/0489 (2013.01)
G06F 3/02 (2006.01)

(52) U.S. Cl.
CPC .............. G06F 3/02 (2013.01); H04N 1/00352 (2013.01); G06F 3/04895 (2013.01); H04N 1/00411 (2013.01); H04N 2201/33307 (2013.01); H04N 1/0049 (2013.01); H04N 1/00474 (2013.01); H04N 2201/0091 (2013.01); H04N 1/00384 (2013.01); G06F 3/0202 (2013.01)
USPC .......................................................... 341/22

(58) Field of Classification Search
USPC ............... 341/22, 23; 200/310–314; 345/170; 700/83; 715/710, 717, 718, 840
See application file for complete search history.

(56) References Cited

U.S. PATENT DOCUMENTS 5,818,361 A 10/1998 Acevedo
6,172,625 B1 * 1/2001 Jin et al. ......................... 341/67

(Continued)

FOREIGN PATENT DOCUMENTS

JP 07-104903 4/1995
JP 11-53086 A 2/1999
JP 2003-280789 A 10/2003

OTHER PUBLICATIONS

Office Action issued Dec. 10, 2013 in Japanese Patent Application No. 2013-065137.

Primary Examiner — Khanh V Nguyen
(74) Attorney, Agent, or Firm — Oblon, Spivak, McClelland, Maier & Neustadt, L.L.P.

(57) ABSTRACT

An input-key control device is mounted on an apparatus having a plurality of operating modes and controls a plurality of input keys that receive input provided by a user. The input-key control device includes: a key-related-information storage unit that stores the operating modes and key-identifying information in association with each other, the key-identifying information being information for identifying an operable input key; an input-key identifying unit that identifies, when the operating mode is switched, an input key which has newly become operable as a result of the switching of the operating mode by comparing the key-identifying information associated with the operating mode before the switching and the key-identifying information associated with the operating mode after the switching; and a light-emission control unit that causes a lighting manner of a light-emitting element that illuminates the input key identified by the input-key identifying unit to differ.

16 Claims, 10 Drawing Sheets

(56) References Cited

U.S. PATENT DOCUMENTS

| | | |
|---|---|---|
| 6,803,864 B2 * | 10/2004 | Chan .................................. 341/22 |
| 7,403,190 B2 * | 7/2008 | Bathiche ........................ 345/170 |
| 8,154,521 B2 * | 4/2012 | Lim et al. ...................... 345/170 |
| 8,174,496 B2 * | 5/2012 | Sagong .......................... 345/156 |
| 8,542,192 B2 * | 9/2013 | Onda et al. ..................... 345/168 |
| 2002/0180621 A1 * | 12/2002 | Chan .................................. 341/22 |
| 2006/0290559 A1 * | 12/2006 | Nakamura et al. ............. 341/176 |
| 2007/0018961 A1 * | 1/2007 | Jeong ............................. 345/170 |
| 2007/0139384 A1 * | 6/2007 | Okayasu ........................ 345/170 |
| 2007/0286596 A1 * | 12/2007 | Lonn .............................. 348/552 |
| 2008/0094366 A1 * | 4/2008 | Kwak et al. .................... 345/170 |
| 2009/0186663 A1 * | 7/2009 | Griffin et al. ................. 455/566 |
| 2009/0225033 A1 | 9/2009 | Hosoda |
| 2010/0033748 A1 | 2/2010 | Enami et al. |
| 2010/0156677 A1 * | 6/2010 | Salman et al. .................. 341/22 |
| 2011/0122069 A1 | 5/2011 | Asakura et al. |

* cited by examiner

| OPERATING MODE | | INPUT KEYS |
|---|---|---|
| STANDBY MODE | | FUNCTION-SELECTION KEYS |
| COPY MODE | NUMBER-OF-COPIES INPUT MODE | FUNCTION-SELECTION KEYS AND NUMERIC KEYS |
| | COPY-PRODUCTION MODE | FUNCTION-SELECTION KEYS, NUMERIC KEYS, AND FUNCTION-PERFORMING KEYS |
| | | |

INPUT-KEY CONTROL DEVICE, AND METHOD AND COMPUTER PROGRAM PRODUCT FOR CONTROLLING INPUT KEY

CROSS-REFERENCE TO RELATED APPLICATIONS

The present application is a continuation application of U.S. application Ser. No. 12/819,537 filed in the U.S. on Jun. 21, 2010 which claims priority to Japanese Patent Application No. 2009-169936 filed in Japan on Jul. 21, 2009, the entire contents of each of which are incorporated herein by reference.

BACKGROUND OF THE INVENTION

1. Field of the Invention

The present invention is directed generally to input-key control device that controls a plurality of input keys that receive input provided by a user, and method and computer program product for controlling the input keys.

2. Description of the Related Art

An image forming apparatus typically includes an operation panel, from which various settings are to be adjusted. An operator can adjust various settings of the image forming apparatus by pressing one or more input keys while monitoring the operation panel. Instructions to the operator, for example, are displayed on the operation panel under the control of a control device of the operation panel depending on the settings of the image forming apparatus.

In recent years, image forming apparatuses have remarkably advanced in functions and come to have a variety of additional functions. As the number of functions increases in this manner, the number of items that are settable from an operation panel has generally increased. An operator is allowed to select a desired item from the settable items to configure the image forming apparatus as required; however, it is desired to facilitate operations and simultaneously satisfy various needs of operators. For instance, apparatuses that display an input key that is operable to receive input in a manner visually distinguishing the input key to thereby facilitate operations using an operation panel are disclosed (see Japanese Patent Laid-open Publication No. H7-104903, for example).

However, as the number of functions increases, the number of items that are settable by a user through an operation panel has increased, resulting in an increase in the number of input keys provided for adjusting settings. This requires a user to select a desired key from a large number of input keys. In other words, operations for adjusting settings are complicated, by which ease of use is disadvantageously impaired.

SUMMARY OF THE INVENTION

It is an object of the present invention to at least partially solve the problems in the conventional technology.

According to one aspect of the present invention, an input-key control device mounted on an apparatus having a plurality of operating modes for controlling a plurality of input keys that receive input provided by a user, the input-key control device includes: a key-related-information storage unit that stores the operating modes and key-identifying information in association with each other, the key-identifying information being information for identifying an input key operable in the operating mode associated with the key-identifying information; an input-key identifying unit that identifies, when the operating mode is switched, an input key which has newly become operable as a result of the switching of the operating mode by comparing the key-identifying information stored in the key-related-information storage unit and associated with the operating mode before the switching and the key-identifying information stored in the key-related-information storage unit and associated with the operating mode after the switching; and a light-emission control unit that causes a lighting manner of a light-emitting element that illuminates the input key identified by the input-key identifying unit to differ from a lighting manner of a light-emitting element that illuminates remaining input key.

According to another aspect of the present invention, an input-key control method to be performed on an input-key control device mounted on an apparatus having a plurality of operating modes for controlling a plurality of input keys that receive input provided by a user, the method includes: storing the operating modes and key-identifying information in association with each other in a key-related-information storage unit provided in the input-key control device, the key-identifying information being information for identifying an input key which is operable in the operating mode associated with the key-identifying information; identifying, when the operating mode is switched, an input key which has newly become operable as a result of the switching of the operating mode by causing an input-key identifying unit provided in the input-key control device to compare the key-identifying information stored in the key-related-information storage unit and associated with the operating mode before the switching and the key-identifying information stored in the key-related-information storage unit and associated with the operating mode after the switching; and controlling light emission by causing a light-emission control unit provided in the input-key control device to cause a lighting manner of a light-emitting element that illuminates the input key identified in the identifying to differ from a lighting manner of a light-emitting element that illuminates remaining input key.

According to still another aspect of the present invention, a computer program product including a computer-usable medium having computer-readable program instructions for executing an input-key control process in a computer that is mounted on an apparatus having a plurality of operating modes and that controls a plurality of input keys that receive input provided by a user, wherein the instructions, when executed by the computer, cause the computer to perform: storing the operating modes and key-identifying information in association with each other in a key-related-information storage unit provided in the computer, the key-identifying information being information for identifying the input key which is operable in the operating mode associated with the key-identifying information; identifying, when the operating mode is switched, an input key which has newly become operable as a result of the switching of the operating mode by comparing the key-identifying information stored in the key-related-information storage unit and associated with the operating mode before the switching and the key-identifying information stored in the key-related-information storage unit and associated with the operating mode after the switching; and controlling light emission by causing a lighting manner of a light-emitting element that illuminates the input key identified in the identifying to differ from a lighting manner of a light-emitting element that illuminates remaining input key.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of input-key control device, and method and computer program product for controlling the input keys according to the present invention are explained in detail below with reference to the accompanying drawings.

An operation panel that includes an input-key control device according to a first embodiment of the present invention is mounted on an image forming apparatus. The operation panel includes a plurality of input keys that receive input provided by an operator, and controls each of the input keys. The operation panel further includes a plurality of light-emitting elements. Each of the input keys is independently associated with a corresponding one of the light-emitting elements. When the light-emitting element is lit, the corresponding input key is transilluminated.

Figures 1, 2:
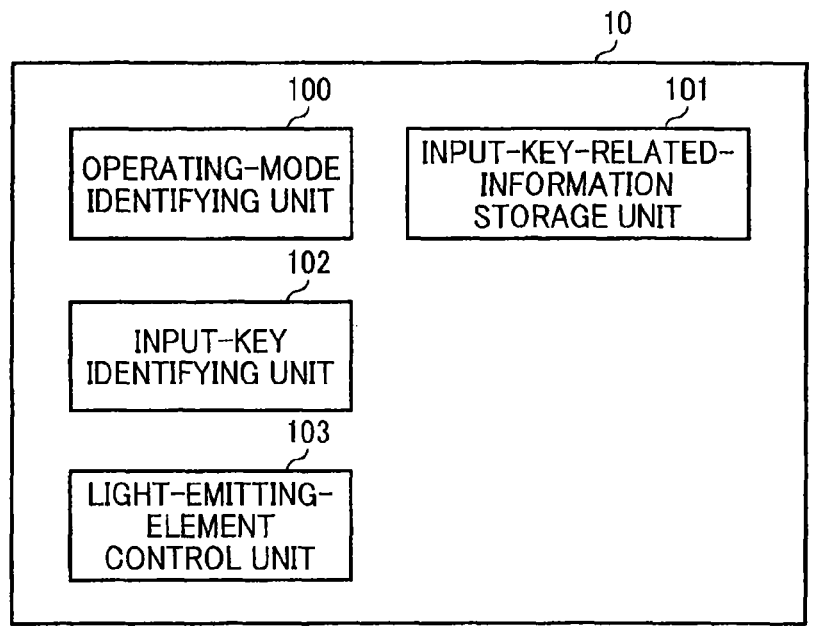
FIG. 1 is a block diagram illustrating major functions of an operation panel according to a first embodiment of the present invention.
FIG. 2 is a diagram schematically illustrating a data structure of an input-key-related-information storage unit depicted in FIG. 1.

FIG. 1 is a block diagram illustrating major functions of an operation panel 10 according to the first embodiment. The operation panel 10 includes an operating-mode identifying unit 100, an input-key-related-information storage unit 101, an input-key identifying unit 102, and a light-emitting-element control unit 103.

The operating-mode identifying unit 100 identifies the operating mode of an image forming apparatus that includes the operation panel 10. The operating-mode identifying unit 100 obtains information indicative of the operating mode from the image forming apparatus and identifies the operating mode in which the image forming apparatus is operating based on this information. The operating mode is, for example, a standby mode, in which the apparatus is ready for receiving input from a key, and a copy mode, in which a copy is produced. The copy mode further has a number-of-copies input mode, in which the number of copies is to be input, and a copy-production mode, in which the thus-input and accepted number of copies is produced.

FIG. 2 is a diagram schematically illustrating a data structure of the input-key-related-information storage unit 101. The input-key-related-information storage unit 101 stores the operating modes and key-identifying information in association with each other. Each operating mode is associated with key-identifying information. The key-identifying information is information for identifying an input key that is operable in the operating mode associated therewith. In the standby mode, an operator can operate function-selection keys. Accordingly, as illustrated in FIG. 2, the input-key-related-information storage unit 101 stores "standby mode," which is one of the operating modes, in association with "function-selection keys," which is key-identifying information. In the number-of-copies input mode, an operator can operate the function-selection keys and numeric keys. Accordingly, as illustrated in FIG. 2, the input-key-related-information storage unit 101 stores "number-of-copies input mode," which is one of the operating modes, in association with "function-selection keys" and "numeric keys," each of which is key-identifying information. The function-selection keys and the numeric keys will be described later.

When the operating mode is switched from one to another, the input-key identifying unit 102 illustrated in FIG. 1 refers to the input-key-related-information storage unit 101 and compares the key-identifying information associated with the operating mode before the switching and the key-identifying information associated with the operating mode after the switching to identify a supplemental input key, i.e., an input key that has newly become operable as a result of the operating mode switching. In other words, the input-key identifying unit 102 identifies the input key(s) which is associated only with the post-switching operating mode. The input-key identifying unit 102 detects the operating mode switching based on the operating mode identified by the operating-mode identifying unit 100.

The light-emitting-element control unit 103 controls the light-on and light-off of a light-emitting element corresponding to the supplemental input key identified by the input-key identifying unit 102. Specifically, the light-emitting-element control unit 103 causes a manner of light emission (hereinafter, "lighting manner") of the light-emitting element corresponding to the supplemental input key to differ from a lighting manner of light-emitting element(s) corresponding to the remaining input key(s). In this example, the lighting manner denotes luminous intensity and, the remaining input key(s) is operable key(s) other than the supplemental input key.

Figure 3:
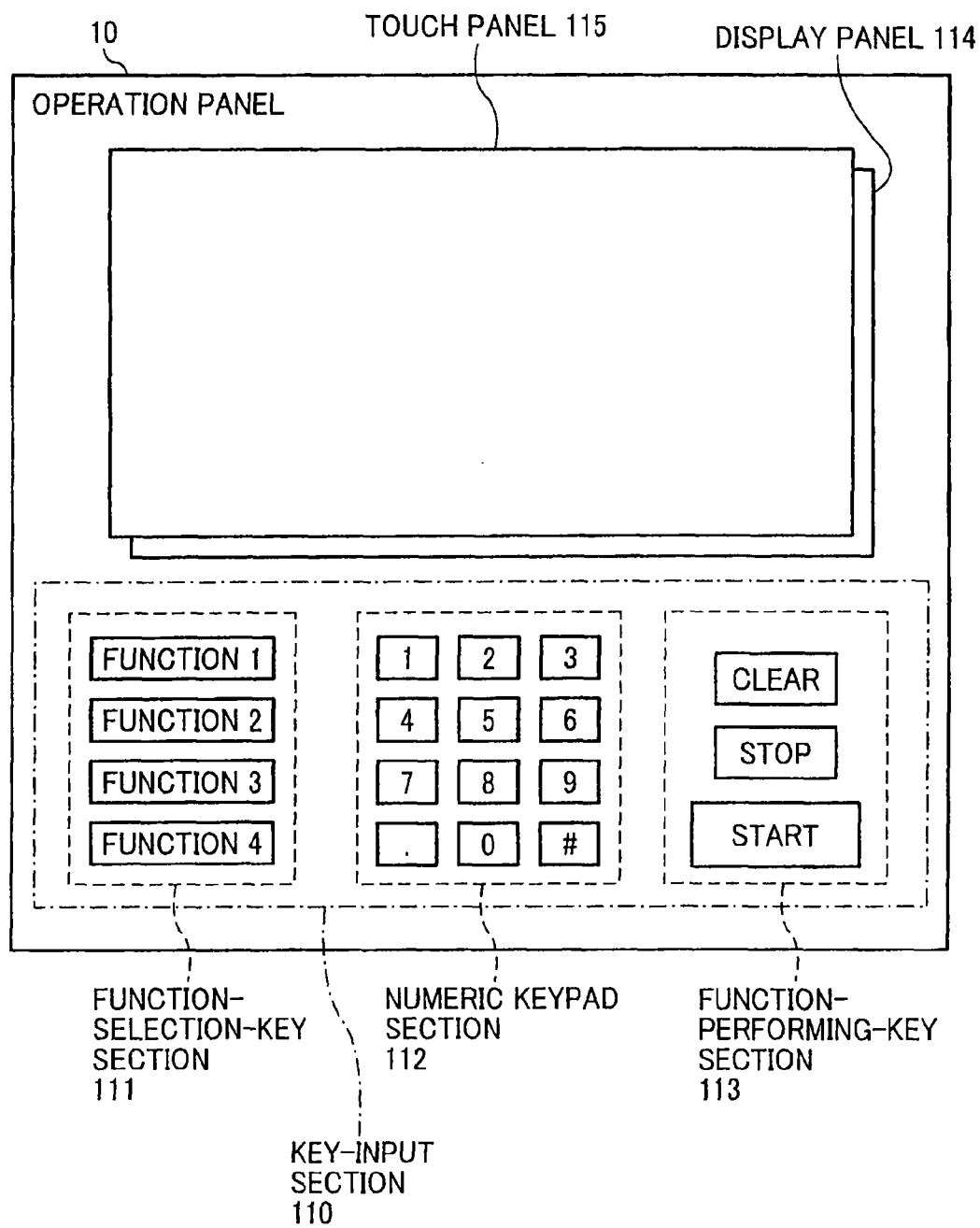
FIG. 3 is a diagram schematically illustrating an appearance of the operation panel according to the first embodiment.

FIG. 3 is a diagram schematically illustrating an appearance of the operation panel 10. The operation panel 10 includes a key-input section 110, a display panel 114, and a touch panel 115. The key-input section 110 includes a function-selection-key section 111, a numeric keypad section 112, and a function-performing-key section 113.

The function-selection-key section 111 includes four input keys associated with functions 1 to 4. An operator can select application software or a function by selecting a desired input key(s). The numeric keypad section 112 includes a plurality of input keys for receiving input of a numeric value or the like provided by an operator. The function-performing-key section 113 includes three input keys (function-performing keys), i.e., a start key, a stop key, and a clear key. The functionperforming-key section 113 receives input to perform operation, stop operation, or reset an operating mode, corresponding to the selected input key.

Figure 4:
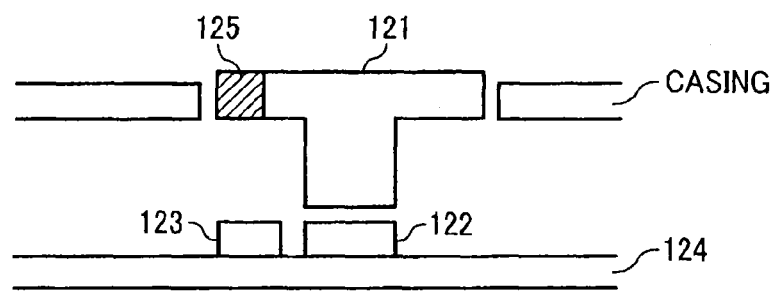
FIG. 4 is a schematic cross-sectional view of an input key according to the first embodiment.

FIG. 4 is a schematic cross-sectional view of an input key. The operation panel 10 includes, in addition to a key top 121 serving as the input key, a switch 122, which is toggled between on and off when the key top 121 is pressed, a light-emitting element 123, which causes the key top to be transilluminated, and a substrate 124 that supports a circuit unit. A light-emitting diode (LED) can be employed as the light-emitting element 123, for example. The single key top 121, and the single switch 122 and the single light-emitting element 123 that correspond to the single key top 121 are illustrated in FIG. 4. The operation panel 10 includes the plurality of input keys as discussed above, and hence the operation panel 10 includes a plurality of the key tops 121, a plurality of the switches 122, and a plurality of the light-emitting elements 123 corresponding to the input keys.

A portion 125 of the key top 121 is formed of a transparent member. This allows the key top 121 to be transilluminated with light emitted from the light-emitting element 123. In the first embodiment, the portion 125 of the key top 121 is formed of the transparent member; alternatively, the entire key top 121 can alternatively be formed of a transparent member.

Figure 5:
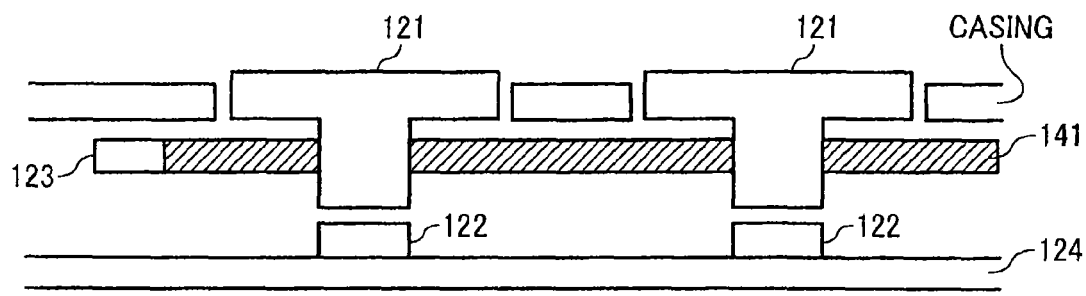
FIG. 5 is a schematic cross-sectional view of a modification of input keys according to the first embodiment.

FIG. 5 is a schematic cross-sectional view of a modification of input keys. In the example illustrated in FIG. 5, at least a portion of the key top 121 is formed of a transparent member. Accordingly, light emitted from the light-emitting element 123 located to the side of the key top 121 can cause the key top 121 to be transilluminated by way of a light-guiding member 141.

Figure 6:
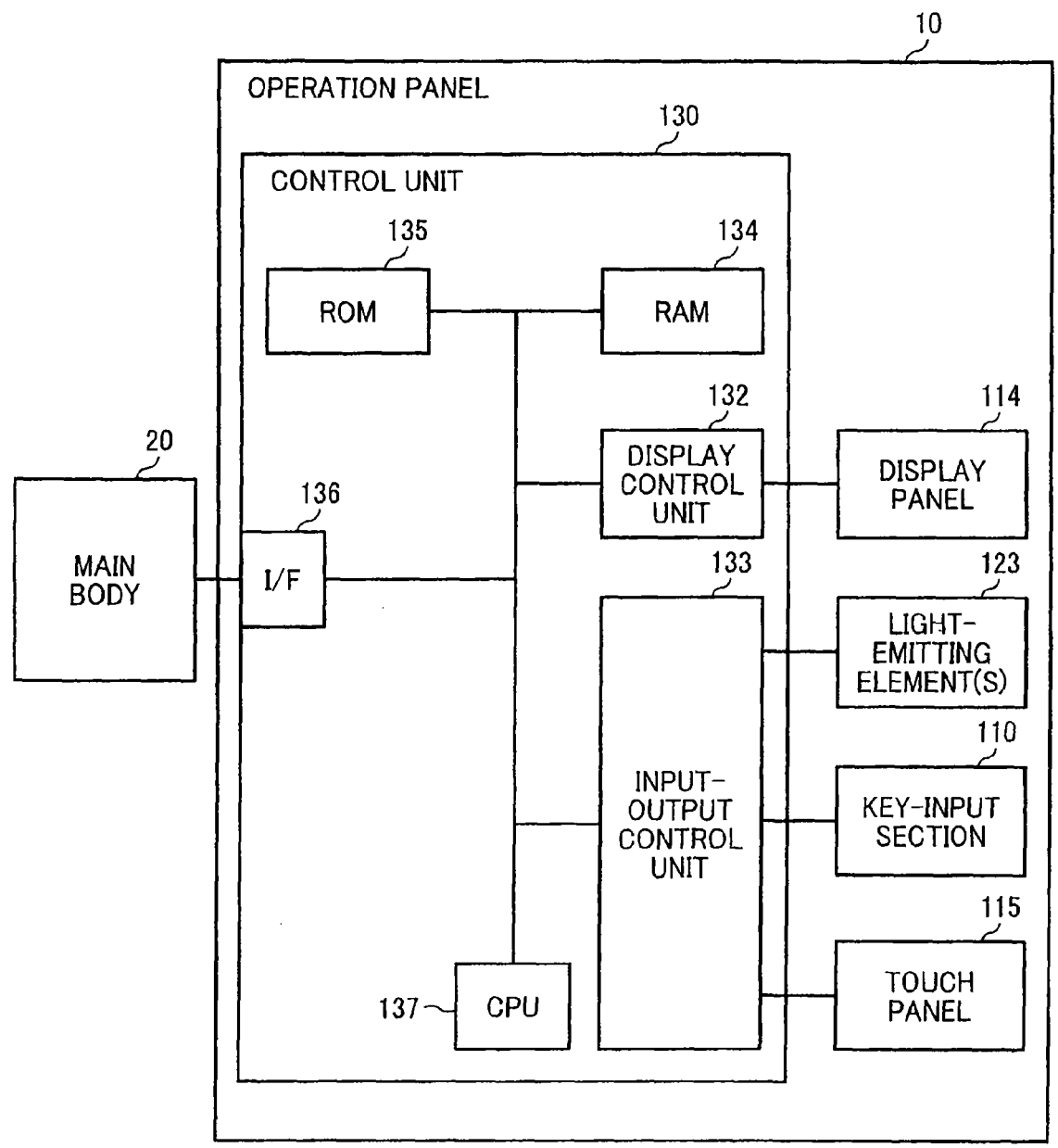
FIG. 6 is a schematic diagram of a hardware structure of the operation panel according to the first embodiment.

FIG. 6 is a schematic diagram of a hardware structure of the operation panel 10. The operation panel 10 includes a control unit 130 in addition to the key-input section 110, the display panel 114, the touch panel 115, and the light-emitting element(s) 123. The control unit 130 includes a display control unit 132, an input-output control unit 133, a random access memory (RAM) 134, a read only memory (ROM) 135, an interface (I/F) 136, and a central processing unit (CPU) 137.

The display control unit 132 controls the display panel 114. The input-output control unit 133 controls the light-emitting element(s) 123, the key-input section 110, and the touch panel 115. More specifically, the input-output control unit 133 controls the light-emitting element(s) 123 such that one or some key tops, which are operable to receive input, among the key tops 121 on the key-input section 110 are transilluminated with predetermined luminous intensity according to operating mode of the image forming apparatus. When an LED is employed as a light source, the luminous intensity can be varied by changing magnitude of electric current passing through to the LED. When pulse-width modulation (PWM) is employed, the luminous intensity can be varied by changing the duration of pulses.

The RAM 134 is used for storing information related to a display screen. The ROM 135 stores program instructions and various setting values. The operation panel 10 is connected to a main body 20 of the image forming apparatus via the I/F 136. The CPU 137 controls the display control unit 132, the input-output control unit 133, the I/F 136, the RAM 134, and the ROM 135.

Figure 7:
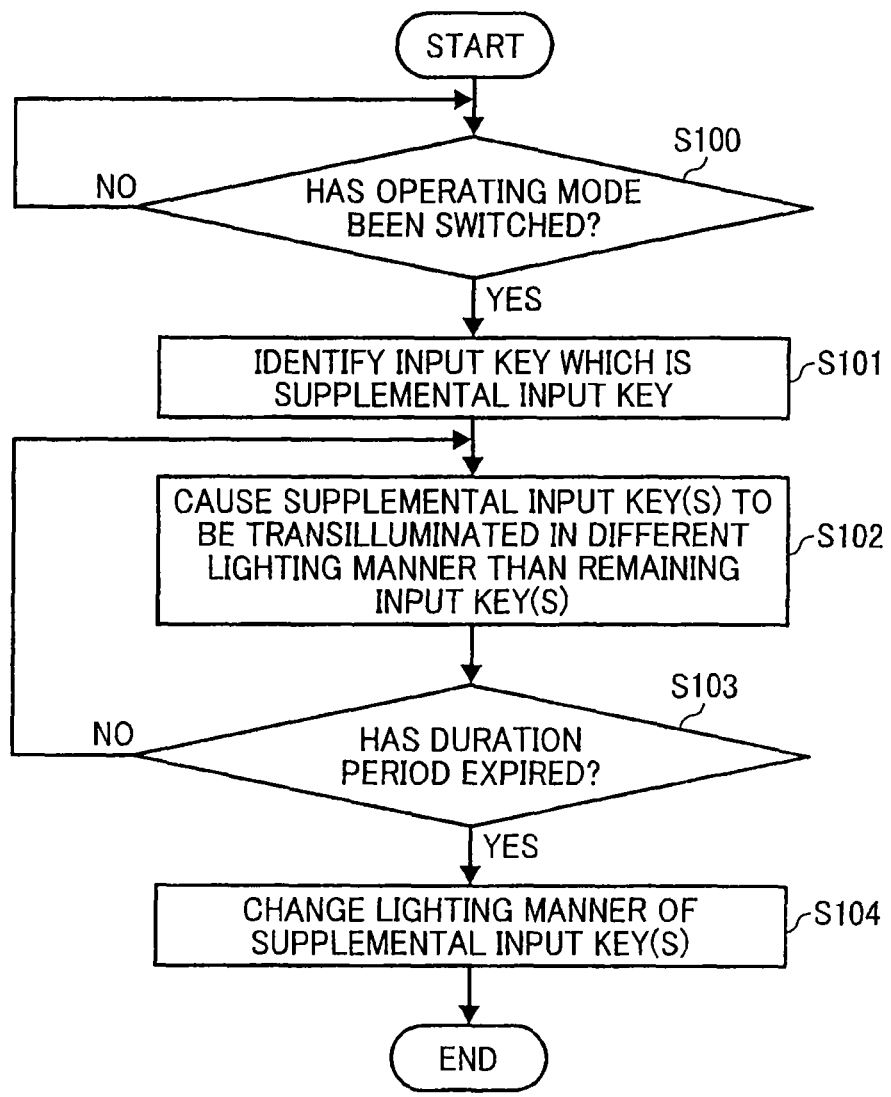
FIG. 7 is a flowchart illustrating a process procedure, through which an input-key control operation is performed by the operation panel according to the first embodiment.

FIG. 7 is a flowchart illustrating a process procedure, through which an input-key control operation is performed in the operation panel 10. When, in the image forming apparatus, operating mode switching has been performed (Yes at Step S100), the input-key identifying unit 102 refers to the input-key-related-information storage unit 101 to identify the supplemental input key, i.e., an input key that has newly become operable to receive input (Step S101). Subsequently, the light-emitting-element control unit 103 causes the supplemental input key(s) to be transilluminated in a different lighting manner than the remaining input key(s) (Step S102). Specifically, the light-emitting-element control unit 103 causes the luminous intensity of the light-emitting element(s) 123 corresponding to the supplemental input key(s) to be higher than the luminous intensity of the light-emitting element(s) 123 corresponding to the remaining input key(s). More specifically, the input-output control unit 133 causes each of the light-emitting element(s) 123 to be lit according to an instruction fed from the light-emitting-element control unit 103.

After expiration of a duration period (Yes at Step S103), the light-emitting-element control unit 103 changes the lighting manner of the supplemental input key(s) (Step S104). Specifically, the light-emitting-element control unit 103 causes the luminous intensity of the light-emitting element(s) 123 corresponding to the supplemental input key(s) to be equal to the luminous intensity of the light-emitting element(s) 123 corresponding to the remaining input key(s). Meanwhile, the duration period is a preset value that ranges from approximately 1 to 10 seconds.

With the operation panel 10 according to the first embodiment, it is allowed to transilluminate an input key(s) that has newly become operable brighter than the remaining input key(s) through the operations discussed above. Accordingly, visual recognition by an operator of the input key that has newly become operable is facilitated. This makes it apparent for the operator which input key is to be operated next.

Figure 8:
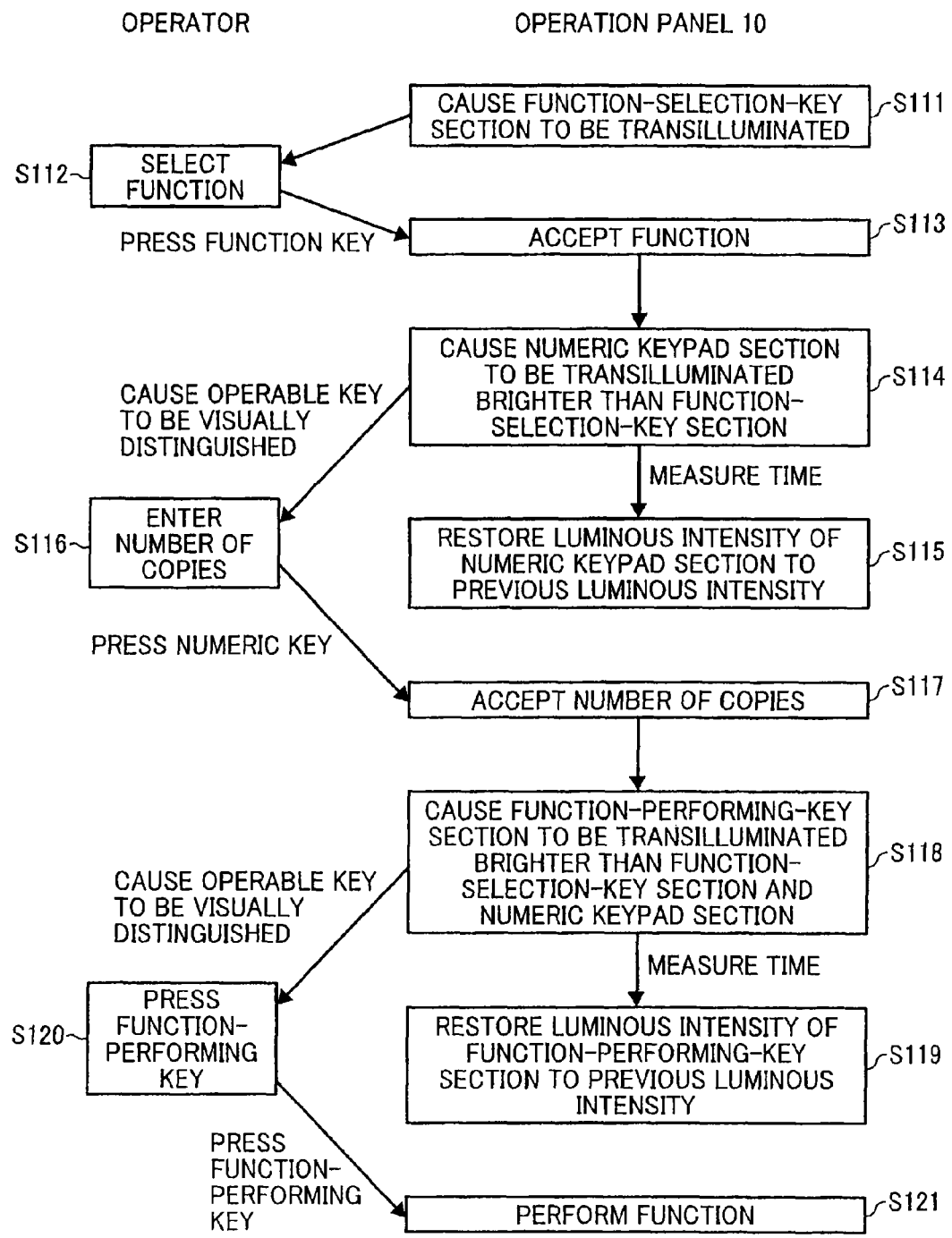
FIG. 8 is a flowchart specifically illustrating a process procedure of the input-key control operation to be performed when producing a copy according to the first embodiment.

FIG. 8 is a flowchart specifically illustrating a process procedure of the input-key control operation to be performed by the image forming apparatus when producing a copy. On the side of the operation panel 10 in the standby mode, based on information contained in the input-key-related-information storage unit 101, only the function-selection-key section 111 of the key-input section 110 is transilluminated to prompt an operator to select a function (Step S111). When the input key for the copying function on the function-selection-key section 111 is pressed by the operator (Step S112), the function is accepted by the operation panel 10 (Step S113). This causes the operating mode to be switched from the standby mode to the number-of-copies input mode of the copy mode.

Subsequently, the input-key identifying unit 102 refers to the input-key-related-information storage unit 101 and identifies the input keys on the numeric keypad section 112 as supplemental input keys that have newly become operable to receive input in the number-of-copies input mode. Subsequently, the light-emitting-element control unit 103 causes the numeric keypad section 112 identified by the input-key identifying unit 102 to be transilluminated brighter than the remaining input keys, i.e., the input keys on the function-selection-key section 111 (Step S114). Specifically, the light-emitting-element control unit 103 causes the luminous intensity of the light-emitting elements 123 each corresponding to a corresponding one of the input keys provided on the numeric keypad section 112 to be higher than luminous intensity of the light-emitting elements 123 each corresponding to a corresponding one of the input keys provided on the function-selection-key section 111.

After expiration of a duration period, the light-emitting-element control unit 103 restores the luminous intensity of the light-emitting elements 123 corresponding to the numeric keypad section 112 to their previous luminous intensity (Step S115). More specifically, the light-emitting-element control unit 103 causes the luminous intensity of the light-emitting elements 123 corresponding to the numeric keypad section 112 to be equal to the luminous intensity of the light-emitting elements 123 corresponding to the function-selection-key section 111.

When the input key(s) on the numeric keypad section 112 is pressed by the operator (Step S116) and adjustment of settings on the number of copies and the like on the operation panel 10 is completed (Step S117), the operating mode is switched from the number-of-copies input mode to the copy-production mode.

Subsequently, the input-key identifying unit 102 refers to the input-key-related-information storage unit 101 and identifies the input keys on the function-performing-key section 113 as supplemental input keys that have newly become operable to receive input in the copy-production mode. Subsequently, the light-emitting-element control unit 103 causes the function-performing-key section 113 to be transilluminated brighter than the function-selection-key section 111 and the numeric keypad section 112 (Step S118). Specifically, the light-emitting-element control unit 103 causes luminous intensity of the light-emitting elements 123 each corresponding to a corresponding one of the input keys provided on the function-performing-key section 113 to be higher than luminous intensity of the light-emitting elements 123 each corresponding to a corresponding one of the input keys provided on the function-selection-key section 111 and the numeric keypad section 112.

After expiration of a duration period, the light-emitting-element control unit 103 restores the luminous intensity of the light-emitting elements 123 corresponding to the function-performing-key section 113 to their previous luminous intensity (Step S119). Specifically, the light-emitting-element control unit 103 causes the luminous intensity of the light-emitting elements 123 corresponding to the function-performing-key section 113 to be equal to the luminous intensity of the light-emitting elements 123 corresponding to the function-selection-key section 111 and the numeric keypad section 112.

When the input key on the function-performing-key section 113 is pressed by the operator (Step S120), a function selected by the operator from the operation panel 10 is performed (Step S121). Specifically, copying operation is performed.

The duration periods, over which the lighting manner of the light-emitting element(s) 123 corresponding to the supplemental input key(s) is made different, are stored in the ROM 135 of the control unit 130 or the like. Settings on the duration periods are configured during manufacturing or at shipment of the image forming apparatus by a manufacturer. Alternatively, a configuration that allows an operator to adjust the duration periods appropriately from the key-input section 110 or the like after the image forming apparatus has been shipped out of the factory can be employed.

As in the case of the light-emitting-element control unit 103 of the operation panel 10 according to the first embodiment, the light-emitting-element control unit of an operation panel 10B according to a second embodiment of the present invention causes a lighting manner of a light-emitting element corresponding to a supplemental input key to differ from a lighting manner of a light-emitting element corresponding to the remaining input key. However, the light-emitting-element control unit of the second embodiment differs from that of the first embodiment in causing the light-emitting element 123 corresponding to the supplemental input key to blink on and off while causing the light-emitting element 123 corresponding to the remaining input key to be lit.

Figure 9:
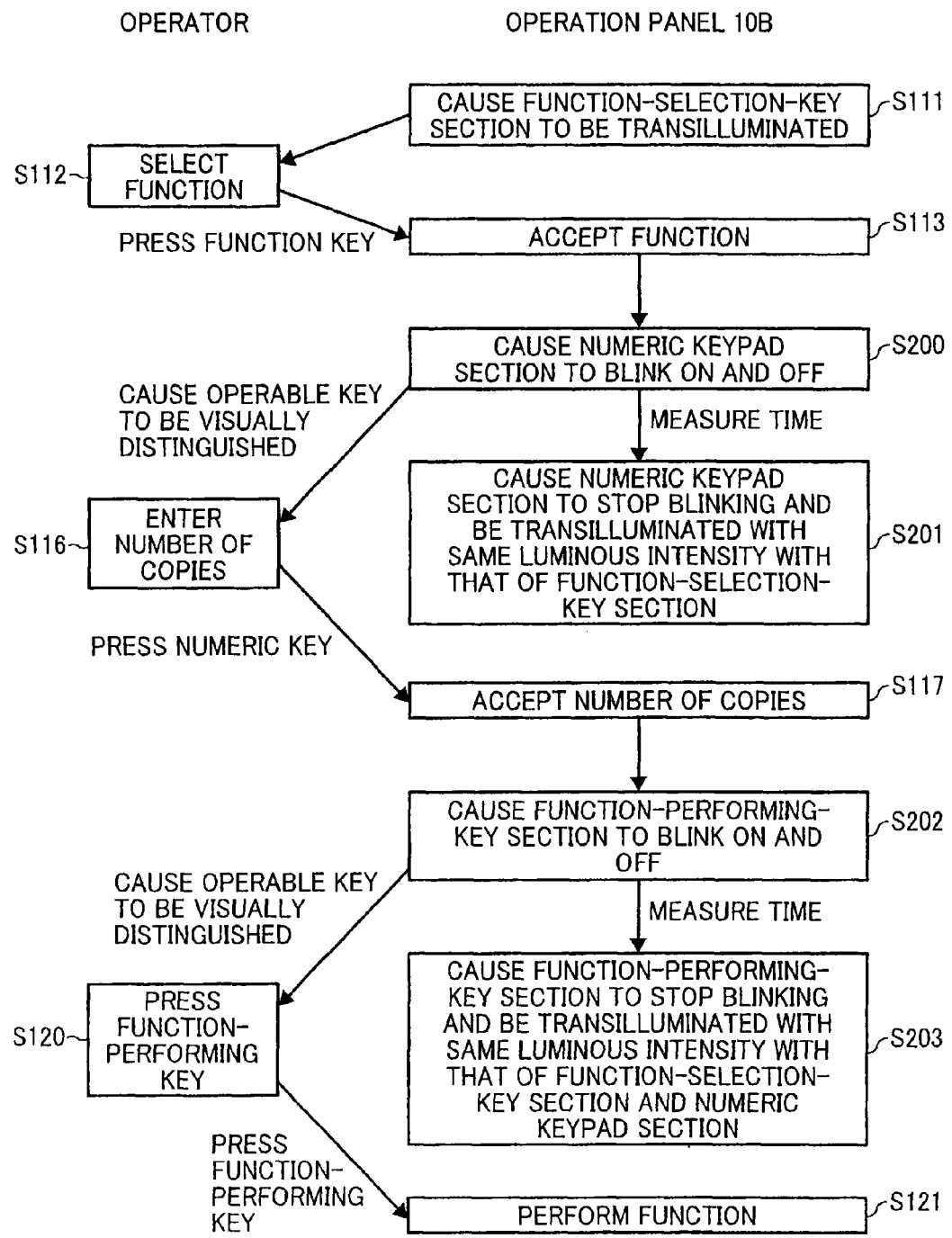
FIG. 9 is a flowchart illustrating a process procedure of an input-key control operation to be performed when producing a copy according to a second embodiment of the present invention.

FIG. 9 is a flowchart illustrating a process procedure of an input-key control operation to be performed by the image forming apparatus that includes the operation panel 10B according to the second embodiment when producing a copy. In this process procedure, when the operating mode is switched from the standby mode to the number-of-copies input mode of the copy mode, the light-emitting-element control unit determines that the input keys on the numeric keypad section 112 are the supplemental input keys and causes the input keys on the numeric keypad section 112 to blink on and off (Step S200). Specifically, the light-emitting-element control unit causes the light-emitting elements 123 each corresponding to a corresponding one of the input keys provided on the numeric keypad section 112 to blink on and off.

After expiration of a duration period, the light-emitting-element control unit causes the light-emitting elements 123 corresponding to the numeric keypad section 112 to stop blinking and then be lit with the same luminous intensity of the light emitting elements corresponding to the function-selection-key section 111 (Step S201).

When adjustment of settings on the number of copies and the like on the operation panel 10B is completed (Step S117), the operating mode is switched from the number-of-copies input mode to the copy-production mode. The light-emitting-element control unit 103 identifies the input keys on the function-performing-key section 113 as the supplemental input keys and causes the input keys on the function-performing-key section 113 to blink on and off (Step S202). After expiration of a duration period, the light-emitting-element control unit causes the light-emitting elements 123 corresponding to the function-performing-key section 113 to stop blinking and be lit with the same luminous intensity with that of the function-selection-key section 111 and the numeric keypad section 112 (Step S203).

Structures and operations pertaining to the operation panel 10B according to the second embodiment other than those discussed above are similar to those pertaining to the operation panel 10 according to the first embodiment.

As discussed above, with the operation panel 10B according to the second embodiment, it is allowed to cause an input key that has newly become operable to blink on and off. Accordingly, visual recognition by an operator of the input key that has newly become operable is facilitated. This makes it apparent for the operator which input key is to be operated next, thereby allowing the operator to readily perform an operation, even when the operation is complicated.

As in the case of the light-emitting-element control unit 103 of the operation panel 10 according to the first embodiment, the light-emitting-element control unit of an operation panel 10C according to a third embodiment of the present invention causes a lighting manner of a light-emitting element(s) corresponding to a supplemental input key(s) to differ from a lighting manner of a light-emitting element(s) corresponding to the remaining input key(s). However, the light-emitting-element control unit of the third embodiment differs from that of the first embodiment in providing variation of the lighting manner by causing colors of light to differ from each other.

Figure 10:
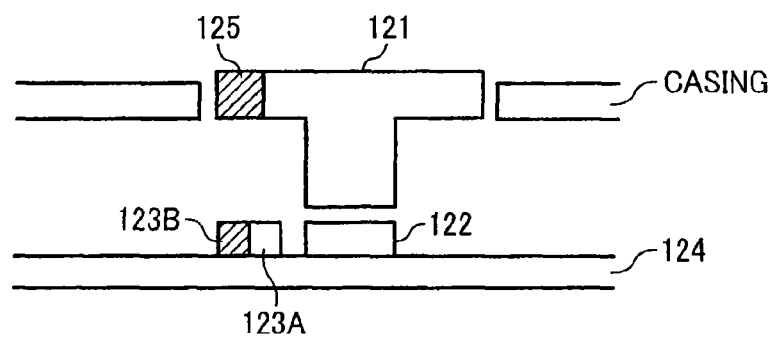
FIG. 10 is a schematic cross-sectional view of an input key according to a third embodiment of the present invention.
Figure 11:
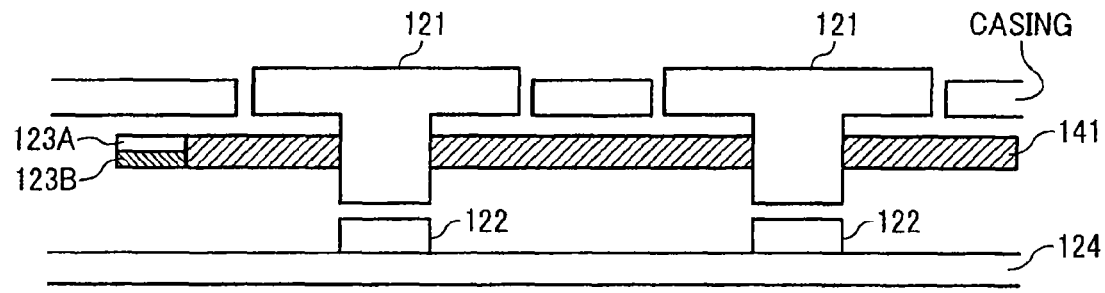
FIG. 11 is a schematic cross-sectional view of a modification of input keys according to the third embodiment.

FIG. 10 is a schematic cross-sectional view of an input key according to the third embodiment. The operation panel 10C according to the third embodiment includes light-emitting elements 123A and light-emitting elements 123B that emit light of different colors. FIG. 11 is a schematic cross-sectional view of a modification of input keys. Also in this modification, the operation panel 10C includes the light-emitting elements 123A and the light-emitting elements 123B. By virtue of being provided with the light-emitting elements 123A and 123B, it is allowed to cause a supplemental input key and the remaining input key to be transilluminated in different colors.

Figure 12:
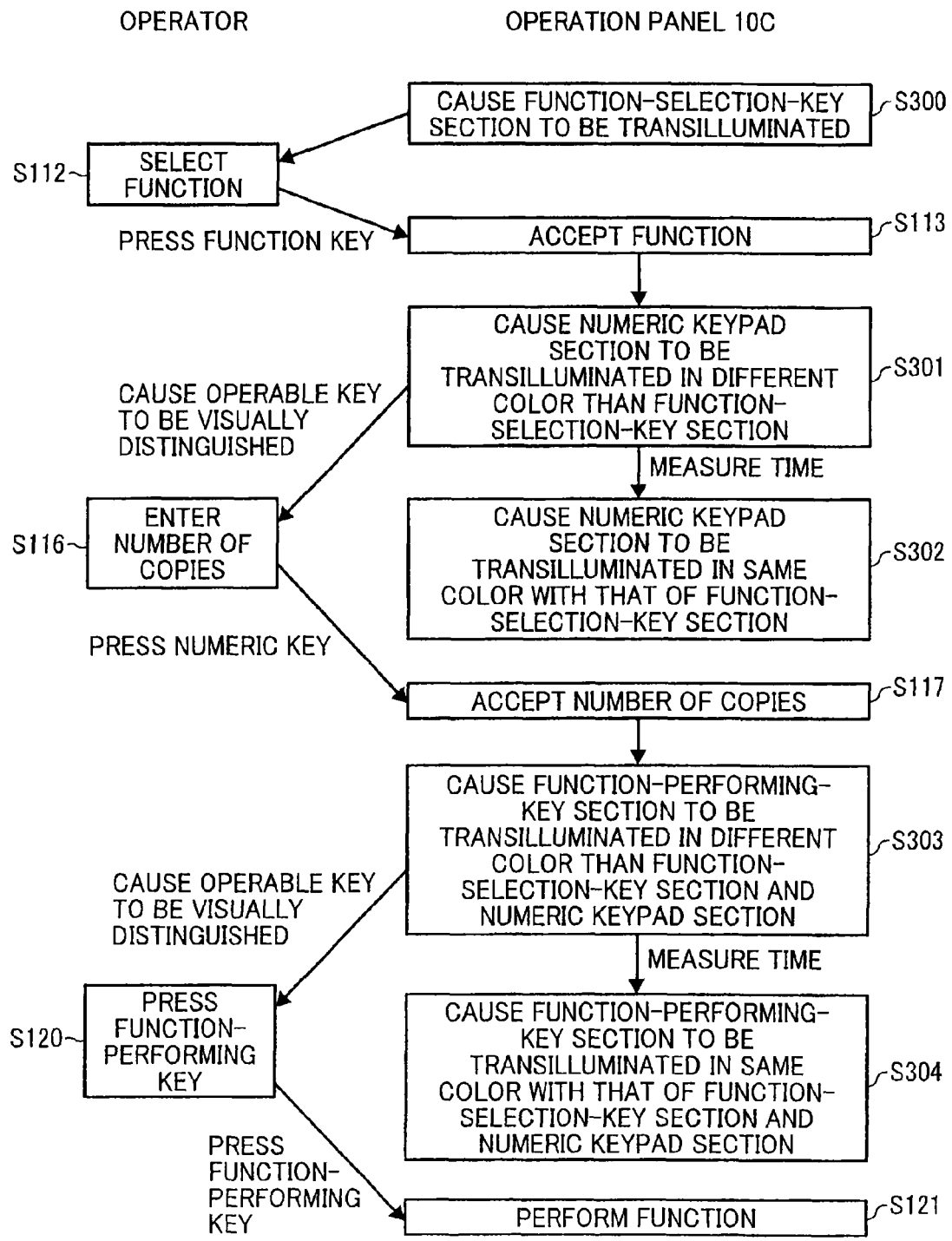
FIG. 12 is a flowchart illustrating a process procedure of an input-key control operation to be performed when producing a copy according to the third embodiment.

FIG. 12 is a flowchart illustrating a process procedure of an input-key control operation to be performed by the image forming apparatus that includes the operation panel 10C according to the third embodiment when producing a copy. In the process procedure, the function-selection-key section 111 is transilluminated first in the standby mode (Step S300). Specifically, the light-emitting elements 123A corresponding to the function-selection-key section 111 are transilluminated.

When the operating mode is switched from the standby mode to the number-of-copies input mode of the copy mode, the light-emitting-element control unit 103 determines that the numeric keypad section 112 is the supplemental input key and causes the numeric keypad section 112 to be transilluminated in a different color than the function-selection-key section 111 (Step S301). Specifically, the light-emitting elements 123B corresponding to the numeric keypad section 112 are lit. After expiration of a duration period, the light-emitting-element control unit 103 causes the numeric keypad section 112 to be transilluminated in the same color with that of the function-selection-key section 111 (Step S302). Specifically, light emission from the light-emitting elements 123B corresponding to the numeric keypad section 112 is stopped and the light-emitting elements 123A corresponding to the same are lit.

When adjustment of settings on the number of copies and the like on the operation panel 10C is completed (Step S117), the operating mode is switched from the number-of-copies input mode to the copy-production mode. The light-emitting-element control unit determines that the function-performing-key section 113 is the supplemental input key and causes the function-performing-key section 113 to be transilluminated in a different color than the function-selection-key section 111 and the numeric keypad section 112 (Step S303). Specifically, light-emitting elements 123B corresponding to the function-performing-key section 113 are lit. After expiration of a duration period, the light-emitting-element control unit causes the function-performing-key section 113 to be transilluminated in the same color with that of the function-selection-key section 111 and the numeric keypad section 112 (Step S304). Specifically, light emission from the light-emitting elements 123B corresponding to the function-performing-key section 113 is stopped and the light-emitting elements 123A corresponding to the same are lit.

Structures and operations pertaining to the operation panel 10C according to the third embodiment other than those discussed above are similar to those pertaining to the operation panel 10/10B according to the first and second embodiments.

As discussed above, with the operation panel 10C according to the third embodiment, it is allowed to transilluminate an input key that has newly become operable in a different color than the remaining input key(s). Accordingly, visual recognition by an operator of the input key that has newly become operable is facilitated. This makes it apparent for the operator which input key is to be operated next, thereby allowing the operator to readily perform an operation, even when the operation is complicated.

Program instructions to be executed in the operation panel 10/10B/10C according to the embodiment can be provided as being recorded in a computer-readable recording medium such as a compact disk (CD)-ROM, a flexible disk (FD), a CD-recordable (CD-R), and a digital versatile disk (DVD) in an installable format or an executable format.

The program instructions to be executed in the operation panel 10/10B/10C according to the embodiment can be configured to be stored in a computer connected to a network such as the Internet so that the program instructions can be downloaded via the network. The program instructions to be executed in the operation panel 10/10B/10C according to the embodiment can be configured to be provided or distributed via a network such as the Internet. The program instructions to be executed in the operation panel 10/10B/10C according to the embodiment can be configured to be provided as being preinstalled in a ROM or the like.

The program instructions to be executed in the operation panel 10/10B/10C according to the embodiment have a module configuration including the units illustrated in FIG. 1. In view of actual hardware, it is configured such that a CPU (processor) executes the program instructions by reading the program instructions from the storage device and loading the units on a main memory device to thereby generate the units on the main memory device.

Figure 13:
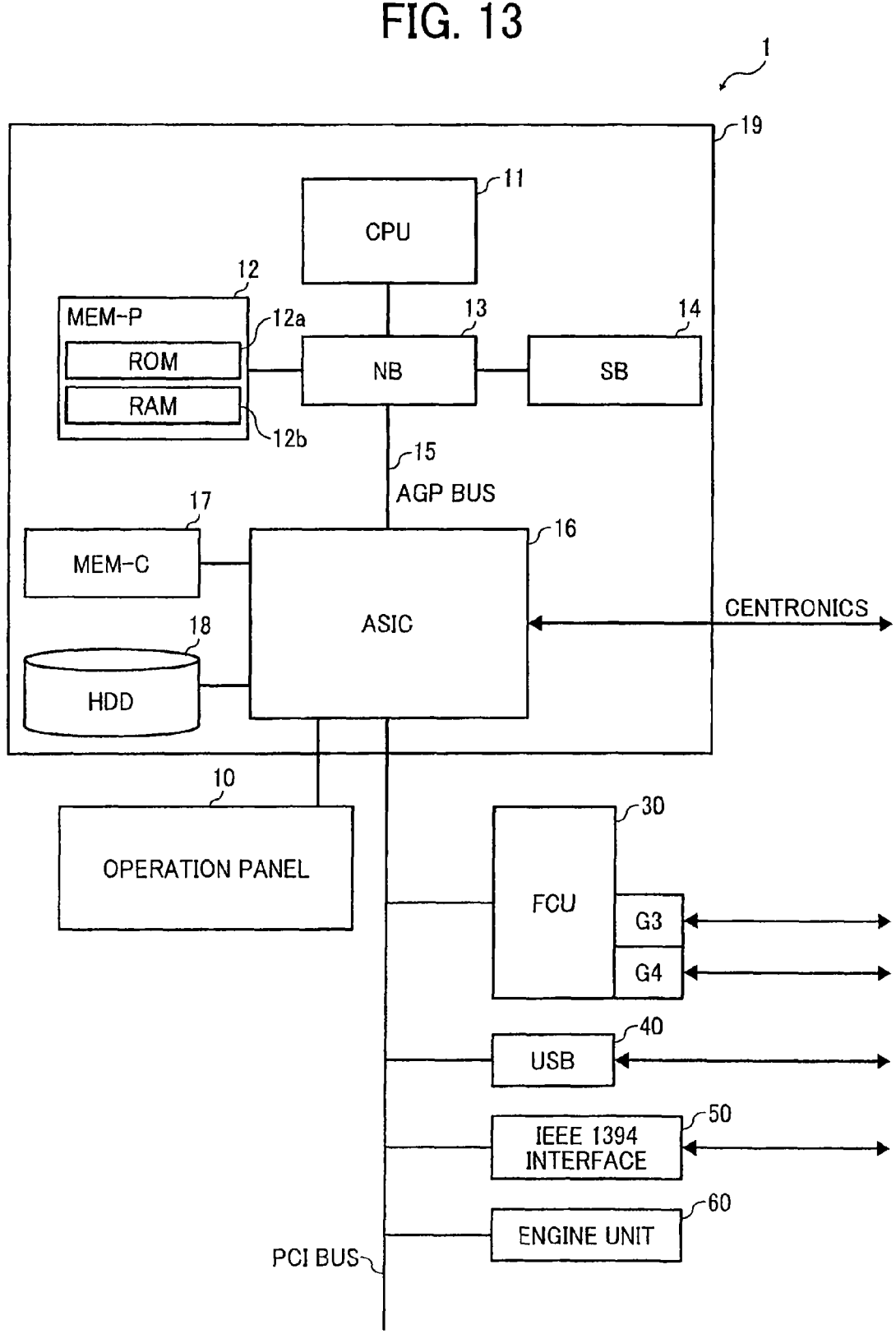
FIG. 13 is a block diagram illustrating a hardware structure of a multifunction peripheral serving as an image forming apparatus that includes the operation panel according to the first, second, or third embodiment.

FIG. 13 is a block diagram illustrating a hardware structure of a multifunction peripheral (MFP) 1 serving as the image forming apparatus that includes the operation panel 10/10B/10C according to the first, second, or third embodiment. As illustrated in FIG. 13, the MFP 1 includes a controller 19 and an engine unit 60 that are connected via a peripheral component interconnect (PCI) bus. The controller 19 is a controller that controls the overall MFP 1, drawing, communications, and inputs fed from an operating unit (not shown). The engine unit 60 is a printer engine or the like that is connectable to the PCI bus. Examples of the engine unit 60 include a monochrome plotter, a one-drum color plotter, a four-drum color plotter, a scanner, and a facsimile unit. The engine unit 60 includes, in addition to what is called an engine section such as the plotter, an image processing section that performs error diffusion, gamma conversion, and the like.

The controller 19 includes a CPU 11, a north bridge (NB) 13, a system memory (hereinafter, "MEM-P") 12, a south bridge (SB) 14, a local memory (hereinafter, "MEM-C") 17, an application-specific integrated circuit (ASIC) 16 that is connected to the NB 13 via an accelerated graphics port (AGP) bus 15, and a hard disk drive (HDD) 18. The MEM-P 12 further includes a ROM 12a and a RAM 12b.

The CPU 11 that controls the overall MFP 1 includes a chip set that includes the NB 13, the MEM-P 12, and the SB 14. The CPU 11 is connected to other device via the chip set.

The NB 13 is a bridge for connecting the CPU 11 to the MEM-P 12, the SB 14, and the AGP bus 15. The NB 13 includes a PCI master, an AGP target, and a memory controller that controls reading and writing from and to the MEM-P 12 and the like.

The MEM-P 12 that includes the ROM 12a and the RAM 12b is a system memory for use as a memory for storing program instructions and data, as a memory on which program instructions and data are to be loaded, as a memory for drawing performed by the printer, and the like. The ROM 12a is a read only memory for use as a memory for storing data and program instructions. The RAM 12b is a writable and readable memory for use as a memory on which program instructions and data are to be loaded, as a memory for drawing performed by the printer, and the like.

The SB 14 is a bridge for connecting the NB 13 to the PCI bus and to peripheral devices. The SB 14 is connected to the NB 13 via the PCI bus, to which a network I/F unit and the like are also connected.

The ASIC 16 that includes hardware component for image processing is an integrated circuit (IC) for use in image processing. The ASIC 16 functions as a bridge that connects the AGP bus 15, the PCI bus, the HDD 18, and the MEM-C 17 with each other. The ASIC 16 includes a PCI target and an AGP master, an arbiter (ARB) serving as the core for the ASIC 16, a memory controller that controls the MEM-C 17, a plurality of direct memory access controllers (DMACs) that control rotation of image data and the like by hardware logic, and a PCI unit that performs data transfer to and from the engine unit 60 via the PCI bus. A facsimile control unit (FCU) 30, a universal serial bus (USB) 40, and an IEEE (the Institute of Electrical and Electronics Engineers) 1394 interface 50 are connected to the ASIC 16 via the PCI bus.

The MEM-C 17 is a local memory for use as a copy image buffer and a code buffer. The HDD 18 is a storage for storing image data, program instructions, font data, and forms.

The AGP bus 15 is a bus interface for a graphics accelerator card introduced to speed up graphics operations and allows direct access to the MEM-P 12 with a high throughput, thereby speeding up operations related to the graphic accelerator card.

The embodiments have been discussed by way of examples where the image processing apparatus is an MFP that has at least two of a copying function, a printer function, a scanner function, and a facsimile function; however, the image processing apparatus can be any image processing apparatus, examples of which include an MFP, a printer, a scanner, and a facsimile apparatus.

According to an aspect of the present invention, ease-of-use of an operation panel is advantageously enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An input device, comprising:
a plurality of sections, each section comprising at least one key and each section occupying a different region of a user interface; and
a controller which causes illumination of the at least one key of a second section of the plurality of sections, in response to a key of a first section being activated, the at least one key which is illuminated providing input related to a function of the key of the first section which has been activated, wherein the at least one key of the second section includes a light-emitting unit that corresponds to the key of the first section.

2. The input device according to claim 1, wherein:
the first section includes a plurality of keys; and
the second section includes a plurality of keys.

3. The input device according to claim 1, wherein:
the plurality of sections includes three sections.

4. The input device according to claim 1, wherein:
the at least one key of the second section is illuminated to be brighter than the key of the first section.

5. The input device according to claim 1, wherein:
the first section is a section for selecting a function, and the second section is a section for indicating a number.

6. The input device according to claim 5, wherein:
the second section includes a section of keys for inputting a number by an operator.

7. The input device according to claim 1, wherein:
the plurality of sections includes at least three sections, and the controller causes illumination of at least one key of a third section of the three sections, in response to a key of the second section being activated.

8. The input device according to claim 7, wherein:
the third section is a section for controlling a function.

9. The input device according to claim 8, wherein:
the third section is a section for controlling a function to stop.

10. The input device according to claim 8, wherein:
the third section is a section for controlling a function to start.

11. An input device, comprising:
a plurality of sections, each section comprising at least one key and each section occupying a different region of a user interface; and
a controller which causes illumination of the at least one key of a first section of the plurality of sections, the first section for receiving input when illuminated, the controller further causing illumination of a second section of the plurality of sections, in response to a key of the first section being activated such that an illumination order of the plurality of sections is a same order as an order of an operator's operations, wherein the second section includes a light-emitting unit that corresponds to the key of the first section.

12. The input device according to claim 11, wherein:
the first section includes a plurality of keys; and
the second section includes a plurality of keys.

13. The input device according to claim 11, wherein:
the plurality of sections includes three sections.

14. The input device according to claim 11, wherein:
the at least one key of the second section is illuminated to be brighter than the key of the first section.

15. The input device according to claim 11, wherein:
the first section is a section for selecting a function, and the second section is a section for indicating a number.

16. The input device according to claim 15, wherein:
the second section includes a section of numeric keys.

* * * * *